(12) United States Patent
Byoun et al.

(10) Patent No.: US 8,928,851 B2
(45) Date of Patent: Jan. 6, 2015

(54) HEAT TREATMENT APPARATUS AND METHOD FOR LCD CELLS

(75) Inventors: Seung Gun Byoun, Suwon-si (KR); Joong Young Ryu, Cheonan-si (KR); Kyun Lae Kim, Suwon-si (KR); Yonmook Park, Suwon-si (KR); Youn Sil Choi, Asan-si (KR); Kyung Gil Baek, Daegu (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 257 days.

(21) Appl. No.: 13/564,845

(22) Filed: Aug. 2, 2012

(65) Prior Publication Data

US 2013/0033670 A1  Feb. 7, 2013

(30) Foreign Application Priority Data

Aug. 4, 2011 (KR) .................. 10-2011-0077649

(51) Int. Cl.
*G02F 1/1333* (2006.01)
*G02F 1/13* (2006.01)
*G02F 1/1341* (2006.01)

(52) U.S. Cl.
CPC ........ *G02F 1/133382* (2013.01); *G02F 1/1303* (2013.01); *G02F 1/1341* (2013.01)
USPC .......................................... 349/161; 349/187

(58) Field of Classification Search
CPC ......... C08L 63/00; G02F 1/13; G02F 1/1337; C08G 73/10
USPC .................................................. 349/161, 187
See application file for complete search history.

(56) References Cited

FOREIGN PATENT DOCUMENTS

| JP | 53071848 A | * | 6/1978 | ................ G02F 1/13 |
| JP | 04204714 A | * | 7/1992 | ............ G02F 1/1337 |
| JP | 05043688 A | * | 2/1993 | ............ C08G 73/10 |
| JP | 07294905 A | * | 11/1995 | ............ G02F 1/1335 |
| JP | 10123532 A | * | 5/1998 | ............ G02F 1/1337 |
| KR | 20100003565 A | | 1/2010 | |

\* cited by examiner

*Primary Examiner* — Huyen Ngo
(74) *Attorney, Agent, or Firm* — Harness, Dickey & Pierce, P.L.C.

(57) ABSTRACT

Disclosed herein are heat treatment apparatuses and methods for liquid crystal display (LCD) cells, which are capable of rapidly transferring heat to liquid crystals injected into an LCD cell, not only to reduce the time taken for the liquid crystals to be changed into a liquid phase, but also to physically promote diffusion of the liquid crystals, thereby achieving a more uniform distribution of the liquid crystals. The apparatus includes a liquid bath, in which a liquid is contained as a medium to transfer heat to the liquid crystals in the LCD cells, a loading device to load or unload the LCD cells into/from the liquid bath, a heater installed in the liquid bath, the heater heating the liquid contained in the liquid bath and transfer heat to the liquid crystals, and a sound wave transmitter installed in the liquid bath and transmitting sound waves to the liquid crystals.

16 Claims, 4 Drawing Sheets

HEAT TREATMENT APPARATUS AND METHOD FOR LCD CELLS

CROSS-REFERENCE TO RELATED APPLICATION

This application claims the benefit of Korean Patent Application No. P2011-77649 filed on Aug. 4, 2011 in the Korean Intellectual Property Office, the disclosure of which is incorporated herein by reference in its entirety.

BACKGROUND

1. Field

Example embodiments relate to heat treatment apparatuses and/or methods for liquid crystal display (LCD) cells.

2. Description of the Related Art

In a stage before electronic devices such as drive modules are mounted thereto, an LCD cell has a structure in which liquid crystals are sealed between two glass sheets. When the distribution of liquid crystals in the LCD cell is non-uniform, defects such as active unfilled area (AUA) defects, electrostatic defects, or butterfly spots may be generated.

When laser repair is carried out to treat pixel defects such as thin film transistor (TFT) defects, bubbles may be formed at damaged areas. That is, bubble spots may be formed.

Such defects are also referred to as "heat treatment defects" in that, when defective products are subjected to heat treatment to obtain a more uniform distribution of liquid crystals in damaged areas, a certain part of the defective products remain uncured.

In order to reduce or eliminate the above-mentioned defects, dry-type heat treatment is mainly used as an LCD process for the LCD cell stage.

Liquid crystals, which have an intermediate phase between a solid phase and a liquid phase at normal temperature, are changed to have the liquid phase upon being heated to a relatively high temperature of 75° C. or more. Accordingly, when the liquid crystal is heated at a relatively high temperature, the liquid crystals may move smoothly.

In the dry-type heat treatment, LCD cells are heated in a chamber in which the LCD cells are stacked in trays, using cassettes each containing a plurality of LCD cells. Normally, the LCD cells are heated for about 120 minutes in each heat treatment. Liquid crystals, which are activated into a liquid phase in accordance with the heat treatment, exhibit a more uniform distribution as time passes. As a result, spot defects, which have been visually noticeable, disappear gradually.

In an LCD post-process carried out after an LCD drive module has been mounted, it may be possible to increase mobility of liquid crystals by driving an LCD pattern, along with the dry-type heat treatment. However, in an LCD pre-process carried out in the LCD cell stage, only a method of simply heating LCD cells is used to increase mobility of liquid crystals because the LCD drive module has not yet been mounted.

In the dry heat treatment, air is used as a heat transfer medium. Transfer of heat through a heat transfer medium is achieved in accordance with collision of molecules in the heat transfer medium. When gas such as air is used as a heat transfer medium, thermal conductivity is relatively low because the distance between molecules of gas, namely, air, is relatively long, and thus the number of times that one molecule, to which heat has been transferred, collides with another molecule is relatively small.

As a result, the time taken for liquid crystals in LCD cells to reach a target temperature is relatively long.

Furthermore, there is no method other than the heating method, as a method to promote diffusion of liquid crystals in LCD cells. Accordingly, it may be difficult to effectively achieve a more uniform distribution of liquid crystals within a relatively short time.

Because of the relatively long time for heat treatment of the LCD cells, it is difficult to achieve a uniform distribution of liquid crystals within a given time. Accordingly, spot defects of LCD cells may not be completely removed.

Consequently, quality degradation and an increase in process cost may occur and productivity may be greatly reduced.

SUMMARY

Inventive concepts provide heat treatment apparatuses and/or methods for liquid crystal display (LCD) cells, which are capable of rapidly transferring heat to liquid crystals injected into an LCD cell, not only to reduce the time taken for the liquid crystals to be changed into a liquid phase, but also to physically promote diffusion of the liquid crystals, thereby achieving a more uniform distribution of the liquid crystals.

Additional inventive concepts will be set forth in part in the description which follows and, in part, will be obvious from the description, or may be learned by practice of the invention.

According to an example embodiment, a liquid crystal display (LCD) cell heat treatment apparatus for heat-treating a plurality of LCD cells each having liquid crystals sealed between two glass sheets, to obtain uniform distribution of the liquid crystals in the LCD cells, includes a liquid bath configured to contain a liquid as a medium to transfer heat to the liquid crystals in the LCD cells, at least one heater installed in the liquid bath, the heater configured to heat the liquid contained in the liquid bath and transfer heat to the liquid crystals in the LCD cells, and at least one sound wave transmitter installed in the liquid bath and configured to transmit sound waves to the liquid crystals in the LCD cells.

The LCD cell heat treatment apparatus may further include a liquid supply tube connected to a lower portion of a side wall of the liquid bath and configured to supply the liquid to an interior of the liquid bath.

The LCD cell heat treatment apparatus may further include a base installed beneath the liquid bath and configured to support the liquid bath, a power supplier installed in the base and configured to supply power to the heater, and a sound wave generator installed in the base and configured to generate sound waves and supply the sound waves to the sound wave transmitter.

The LCD cell heat treatment apparatus may further include a cover installed at a top of the liquid bath and configured to seal the liquid bath after loading of the LCD cells into the liquid bath.

The LCD cell heat treatment apparatus may further include a loading device configured to load and unload the LCD cells into and from the liquid bath. The loading device may include a support plate configured to support the LCD cells, and a lever configured to vertically move the support plate.

The loading device may be configured to adjust a vertical level of the support plate by rotating the lever.

The at least one heater may include heaters respectively installed at opposite walls, for example, left and right walls of the liquid bath within the liquid bath. The heaters may be configured to heat the liquid and maintain the liquid at a desirable (or alternatively, predetermined) temperature, so that heat may be transferred to the liquid crystals in the LCD cells, to uniformly distribute the liquid crystals.

The at least one sound wave transmitter may include sound wave transmitters respectively installed at front, rear and bottom walls of the liquid bath within the liquid bath. The sound wave transmitters may be configured to transmit sound waves to the liquid crystals in the LCD cells, to uniformly distribute the liquid crystals.

According to another example embodiment, an LCD cell heat treatment apparatus for heat-treating a plurality of LCD cells each having liquid crystals sealed between two glass sheets, to obtain uniform distribution of the liquid crystals in the LCD cells, includes a liquid bath configured to contain a liquid as a medium to transfer heat to the liquid crystals in the LCD cells, a loading device to load or unload the LCD cells into/from the liquid bath, at least one heater installed in the liquid bath and configured to heat the liquid contained in the liquid bath such that heat is transferred to the liquid crystals in the LCD cells loaded in the liquid bath, sound wave transmitters respectively disposed adjacent to the LCD cells loaded in the liquid bath and configured to transmit sound waves to the liquid crystals in the LCD cells, and at least one spacing adjuster configured to adjust a spacing between a corresponding one of the LCD cells and a corresponding one of the sound wave transmitters and disposed adjacent to the corresponding LCD cell.

The LCD cell heat treatment apparatus may further include a liquid supply tube connected to a lower portion of a side wall of the liquid bath and configured to supply the liquid to an interior of the liquid bath.

The LCD cell heat treatment apparatus may further include a cover installed at a top of the liquid bath and configured to seal the liquid bath after loading of the LCD cells into the liquid bath.

The LCD cell heat treatment apparatus may further include LCD cell holders installed at a bottom wall of the liquid bath within the liquid bath and configured to firmly hold the LCD cells, and sound wave transmitter holders installed at the bottom wall of the liquid bath within the liquid bath and configured to firmly hold the sound wave transmitters.

The LCD cell heat treatment apparatus may further include a bottom plate mounted on the bottom wall of the liquid bath within the liquid bath. The LCD cell holders and the sound wave transmitter holders may be attached to the bottom plate.

The at least one heater may include heaters respectively installed at front, rear, left and right walls of the liquid bath within the liquid bath. The heaters may be configured to heat the liquid contained in the liquid bath and maintain the liquid at the desirable (or alternatively, predetermined) temperature, so that heat may be transferred to the liquid crystals in the LCD cells, to uniformly distribute the liquid crystals.

The sound wave generators may be installed at front, rear and bottom walls of the liquid bath within the liquid bath, respectively, to transmit sound waves to the liquid crystals in the LCD cells, so as to uniformly distribute the liquid crystals.

According to an example embodiment, an LCD cell heat treatment method for heat-treating a plurality of LCD cells each having liquid crystals sealed between two glass sheets, to obtain uniform distribution of the liquid crystals in the LCD cells, includes supplying a liquid to an interior of a liquid bath via a liquid supply tube, heating the liquid supplied to the interior of the liquid bath by a heater and maintain the liquid at a desirable (or alternatively, predetermined) temperature, loading the LCD cells into the liquid bath by a loading device such that the LCD cells are dipped in the heated liquid maintained at the desirable (or alternatively, predetermined) temperature, thereby causing heat to be transferred to the liquid crystals in the LCD cells, for heat treatment of the LCD cells, adjusting a spacing between each of the LCD cells and a sound wave transmitter by adjusting a vertical level of a support plate in the loading device, the support plate configured to support the LCD cells, transmitting sound waves to the liquid crystals in the LCD cells by the sound wave transmitter, and unloading the LCD cells from the liquid bath by the loading device after completion of the heat treatment.

BRIEF DESCRIPTION OF THE DRAWINGS

These and/or other aspects of the inventive concepts will become apparent and more readily appreciated from the following description of the example embodiments, taken in conjunction with the accompanying drawings of which.

Figure 1:
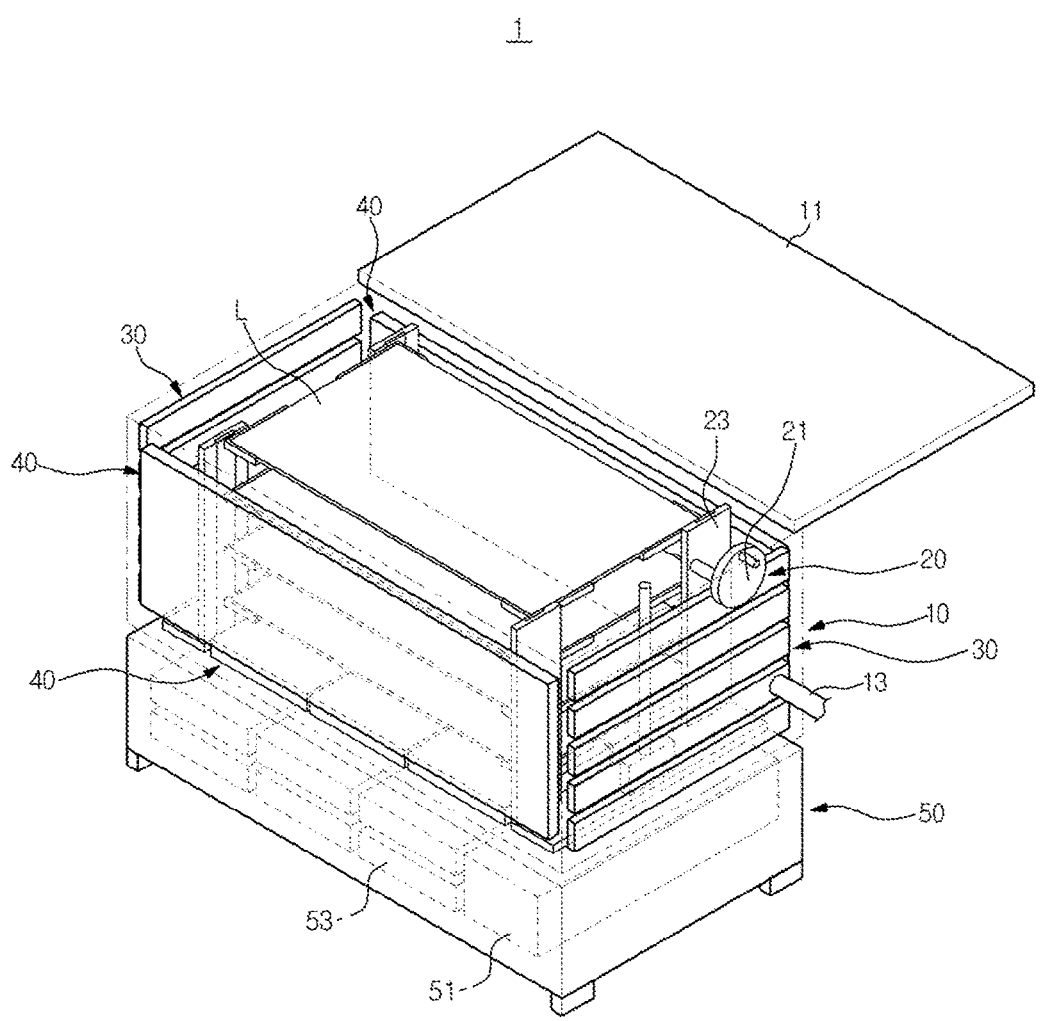
FIG. 1 is a perspective view illustrating a heat treatment apparatus for liquid crystal display (LCD) cells according to an example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments will now be described more fully with reference to the accompanying drawings. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments of the inventive concepts will be described with reference to the accompanying drawings.

Figure 2:
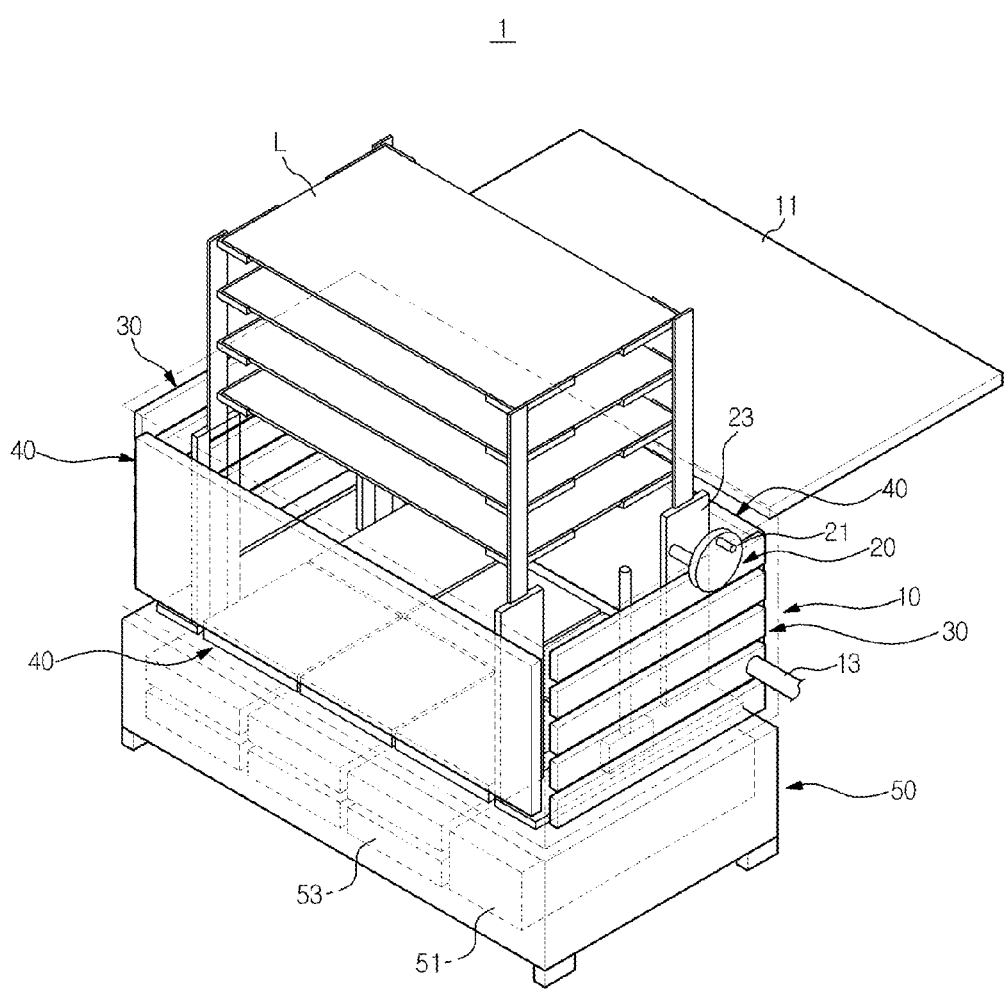
FIG. 2 is a perspective view illustrating loading/unloading of LCD cells into/from the heat treatment apparatus for LCD cells according to the example embodiment of FIG. 1.

Referring to FIGS. 1 and 2, a heat treatment apparatus 1 for liquid crystal display (LCD) cells according to an example embodiment is illustrated. The heat treatment apparatus 1 may include a liquid bath 10, in which a liquid as a heat transfer medium is contained, a loading device 20 to load/unload a plurality of LCD cells L into/from the liquid bath 10, and heaters 30 installed in the liquid bath 10, which heat the liquid contained in the liquid bath 10. The heat treatment apparatus 1 may also include sound wave transmitters 40 installed in the liquid bath 10, which transmit sound waves to liquid crystals in the LCD cells L loaded in the liquid bath 10.

In each LCD cell L, liquid crystals may be sealed between two glass sheets. In order to reduce or prevent a portion of the LCD cell L, in which the liquid crystals are contained, from being physically damaged, and to prevent the heat transfer medium, for example, the liquid, from entering the LCD cell, the peripheral edges of the two glass sheets are watertight-treated using a sealant.

A liquid supply tube 13 may be connected to a lower portion of a side wall of the liquid bath 10, to supply the liquid to the interior of the liquid bath 10. Water may be used as the liquid to be supplied to the interior of the liquid bath 10.

A cover 11 may be installed at a top of the liquid bath 10, to seal the liquid bath 10 when a plurality of LCD cells L has been loaded in the liquid bath 10.

A base 50 may be installed beneath the liquid bath 10, to support the liquid bath 10. In the base 50, a power supplier 51 to supply electric power to the heaters 30 may be disposed. Sound wave generators 53, which generate sound waves, may also be disposed in the base 50, to supply sound waves to the sound wave transmitters 40.

A plurality of LCD cells L may be loaded or unloaded into/from the liquid bath 10 by the loading device 20.

The loading device 20 may include support plates 23 to support LCD cells L to be loaded or unloaded, and a lever 21 to vertically move the support plates 23.

Although the loading device 20 is illustrated as loading 4 LCD cells L into the liquid bath 10, it may be configured to load more than 4 LCD cells L or less than 4 LCD cells L into the liquid bath 10, without being limited to the illustrated example embodiment.

The loading device 20 may adjust vertical levels of LCD cells L supported by the support plates 23 by rotating the lever 21, and thus vertically moving the support plates 23.

As the vertical levels of LCD cells L are adjusted by the loading device 20, it may be possible to adjust the spacing between each LCD cell L and the sound wave transmitters 40 installed at the bottom of the liquid bath 10.

Although not shown, a spacing adjuster (not shown) may be separately installed to adjust the vertical levels of LCD cells supported by the support plates 23, and thus to adjust the spacing between each of the LCD cells L and the sound wave transmitters 40.

The heaters 30, which heat the liquid supplied to the liquid bath 10, may be installed at left and right walls of the liquid bath 10 within the liquid bath 10, respectively.

Although the heaters 30 are illustrated as being installed at the left and right walls of the liquid bath 10, they may be installed at other portions of the liquid bath 10 within the liquid bath 10, without being limited to the example embodiment.

The heaters 30 disposed within the liquid bath 10 may receive electric power from the power supplier 51 installed in the base 50, thereby heating the liquid supplied to the interior of the liquid bath 10 to a desirable (or alternatively, predetermined) temperature at which the LCD cells L loaded in the liquid bath 10 are effectively heat-treated, and maintaining the liquid at the desirable (or alternatively, predetermined) temperature.

Heat is transferred to the liquid crystals in the LCD cells L via a medium, for example, the liquid, which is maintained at the desirable (or alternatively, predetermined) temperature by the heater 30. As the liquid crystals receive heat, they may be diffused to have a more uniform distribution.

In order to more effectively diffuse the liquid crystals in the LCD cells L, which receive heat when being loaded in the liquid bath 10, the sound wave transmitters 40 may be installed in the liquid bath 10, to transmit sound waves to the liquid crystals.

Although the sound wave transmitters 40 are illustrated as being installed at front, rear, and bottom walls of the liquid bath 10, they may be installed at other portions of the liquid bath 10 within the liquid bath 10, without being limited to the example embodiment.

The sound wave transmitters 40 installed in the liquid bath 10 may receive sound waves from the sound wave generators 53 installed in the base 50.

After receiving sound waves from the sound wave generator 53, the sound wave transmitters 40 may transmit the received sound waves to the liquid crystals in the LCD cells L via the medium, for example, the liquid in the liquid bath 10. As the liquid crystals receive sound waves, they may be diffused to have a more uniform distribution.

The intensity of the sound waves artificially promoting diffusion of the liquid crystals in the LCD cells L may be adjusted such that the sound waves do not damage the watertight-treated sealing portions of the peripheral edges of the two glass sheets and thin film transistor (TFT) circuits.

As sound waves are transmitted to the liquid crystals in the LCD cells L, along with heat, the liquid crystals may be effectively diffused within a relatively short time.

Figure 3:
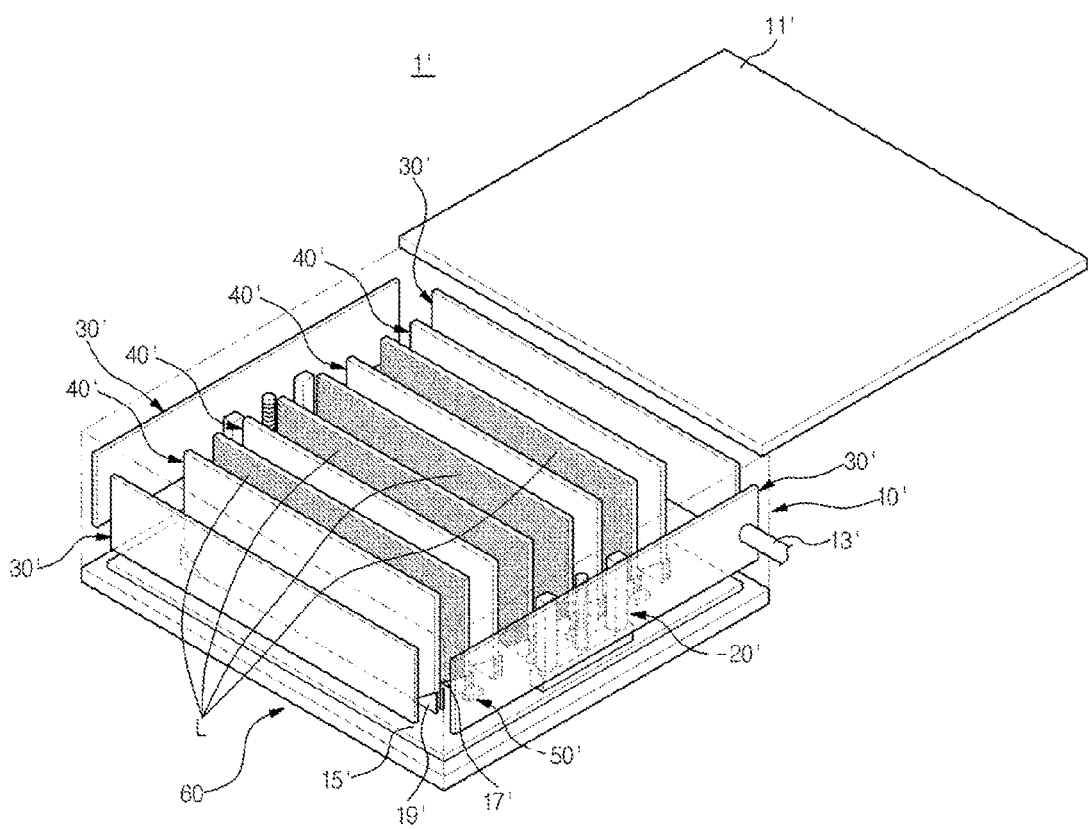
FIG. 3 is a perspective view illustrating a heat treatment apparatus for liquid crystal display (LCD) cells according to an example embodiment.
Figure 4:
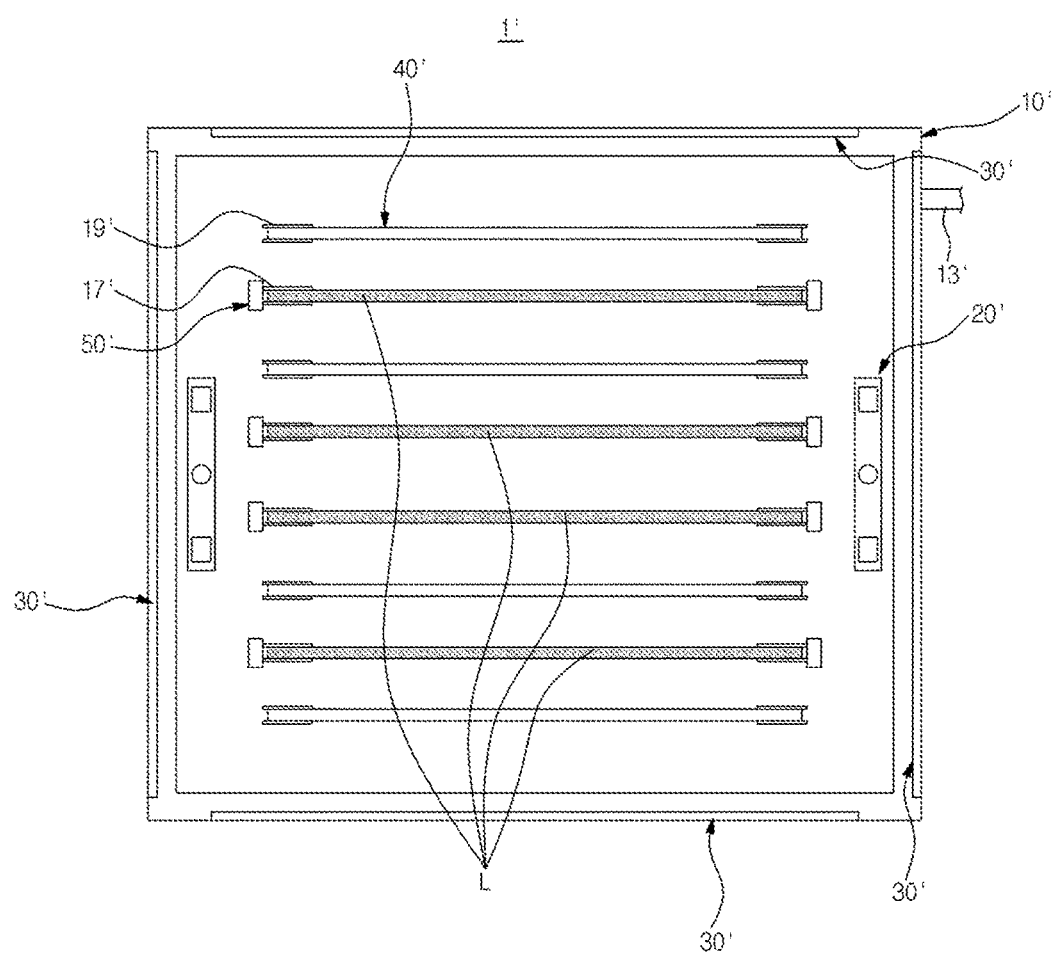
FIG. 4 is a plan view illustrating the heat treatment apparatus for liquid crystal display (LCD) cells according to the embodiment of FIG. 3.

FIGS. 3 and 4 illustrate a heat treatment apparatus for LCD cells according to an example embodiment.

As shown in FIGS. 3 and 4, the heat treatment apparatus, which is designated by reference numeral "1'", may include a liquid bath 10', in which a liquid as a heat transfer medium is contained, a loading device 20' to load/unload a plurality of LCD cells L into/from the liquid bath 10', and heaters 30' installed in the liquid bath 10', to heat the liquid contained in the liquid bath 10'. The heat treatment apparatus 1' may also include sound wave transmitters 40' installed in the liquid bath 10', to transmit sound waves to liquid crystals in the LCD cells L loaded in the liquid bath 10', and at least one spacing adjuster 50' to adjust the spacing between a corresponding one of the LCD cells L and the sound wave transmitter 40', which is arranged adjacent to the corresponding LCD cell L.

A liquid supply tube 13 may be connected to a lower portion of a side wall of the liquid bath 10', to supply the liquid to the interior of the liquid bath 10'. Water may be used as the liquid to be supplied to the interior of the liquid bath 10'.

A cover 11' may be installed at a top of the liquid bath 10', to seal the liquid bath 10' in a state in which a plurality of LCD cells L has been loaded in the liquid bath 10'. A base 60 may be installed beneath the liquid bath 10', to support the liquid bath 10.

LCD cell holders 17' may be mounted on a bottom wall of the liquid bath 10' within the liquid bath 10', to firmly hold the LCD cells L loaded in the liquid bath 10'. Sound wave transmitter holders 19' also may be mounted on the bottom wall of the liquid bath 10' within the liquid bath 10', to firmly hold the sound wave transmitters 40'.

The LCD cell holders 17' and sound wave transmitter holders 19' are attached to a bottom plate 15' mounted on the bottom wall of the liquid bath 10' within the liquid bath 10'.

The spacing adjuster 50' may adjust the spacing between the corresponding LCD cell L held by the corresponding LCD cell holders 17' and the corresponding sound wave transmitter 40' held by the corresponding sound wave transmitter holder 19'.

A plurality of LCD cells L may be loaded or unloaded into/from the liquid bath 10' by the loading device 20'.

The heaters 30', which heat the liquid supplied to the liquid bath 10', may be installed at front, rear, left and right walls of the liquid bath 10' within the liquid bath 10', respectively.

Although the heaters 30' are illustrated as being installed at the front, rear, left and right walls of the liquid bath 10', they may be installed at other portions of the liquid bath 10' within the liquid bath 10', without being limited to the example embodiment.

The heaters 30' disposed within the liquid bath 10' may externally receive electric power, thereby heating the liquid supplied to the interior of the liquid bath 10' to a desirable (or alternatively, predetermined) temperature at which the LCD cells L loaded in the liquid bath 10' are effectively heat-treated, and maintaining the liquid at the desirable (or alternatively, predetermined) temperature.

Heat may be transferred to the liquid crystals in the LCD cells L via a medium, for example, the liquid, which is maintained at the desirable (or alternatively, predetermined) temperature by the heater 30'. As the liquid crystals receive heat, they may be diffused to have a more uniform distribution.

In order to more effectively diffuse the liquid crystals in the LCD cells L, which receive heat in a state of being loaded in the liquid bath 10', the sound wave transmitters 40' may be installed in the liquid bath 10', to transmit sound waves to the liquid crystals.

The sound wave transmitters 40' may be arranged within the liquid bath 10' such that they are adjacent to the LCD cells L loaded in the liquid bath 10', respectively. The sound wave transmitters 40' may externally receive sound waves.

After receiving sound waves, the sound wave transmitters 40 may transmit the received sound waves to the liquid crystals in the LCD cells L via the medium, for example, the liquid in the liquid bath 10'. As the liquid crystals receive sound waves, they may be diffused to have a more uniform distribution.

Next, a heat treatment method for LCD cells according to an example embodiment will be described with reference to FIGS. 1 and 2.

First, a liquid, which is a medium to transmit heat and sound waves, may be supplied to the interior of the liquid bath 10 through the liquid supply tube 13 connected to the liquid bath 10.

The liquid supplied to the interior of the liquid bath 10 may be heated by the heater 30 and maintained at a desirable (or alternatively, predetermined) temperature, at which the LCD cells L to be loaded in the liquid bath 10 will be effectively heat-treated.

When the liquid in the liquid bath 10 is maintained at the desirable (or alternatively, predetermined) temperature in accordance with the heating operation, LCD cells L may be loaded. For example, the cover 11 installed at the top of the liquid bath 10 may be opened and a plurality of LCD cells L may be loaded into the liquid bath 10.

After the LCD cells L are loaded into the liquid bath 10, the cover 11 may be closed to seal the interior of the liquid bath 10. Liquid crystals of the LCD cells L loaded in the liquid bath 10 may receive heat from the liquid contained in the liquid bath 10. Accordingly, the LCD cells L may be effectively heat-treated and thereby diffuse liquid crystals therein to have a more uniform distribution.

When the LCD cells L loaded in the liquid bath 10, the vertical levels of the support plates 23 supporting the LCD cells L may adjust the spacing between each LCD cell L and the sound wave transmitters 40 installed at the bottom wall of the liquid bath 10.

Accordingly, the liquid crystals in the LCD cells L, which have been diffused to have a more uniform distribution by receiving heat from the liquid, may additionally receive sound waves from the sound wave transmitters 40.

For example, the sound wave transmitters 40 may transmit sound waves to the liquid crystals in the LCD cells L via the liquid as a medium. Accordingly, the liquid crystals receiving the sound waves may be further diffuse the liquid crystals that have not been sufficiently diffused by heat. Thus, the liquid crystals in the LCD cells may have a more uniform distribution.

After heat treating for the LCD cells L using heat and sound waves, the cover 11 installed at the top of the liquid bath 10 may be opened, and the LCD cells L may be unloaded from the liquid bath 10 by the loading device 20.

According to example embodiments of the inventive concepts, it may be possible to effectively heat-treat LCD cells within a relatively short time such that liquid crystals in the LCD cells have a more uniform distribution, and thus securing enhanced performance of reducing or removing heat treatment defects such as spot defects. Because the inventive concepts reduce processing time per LCD cell, it may also be possible to achieve an improvement in the quality of LCD cells and an enhancement in productivity.

Although example embodiments of the inventive concept have been shown and described in this specification and figures, it would be appreciated by those skilled in the art that changes may be made in the illustrated embodiments without departing from the principles and spirit of the inventive concepts, the scope of which is defined in the claims and their equivalents.

What is claimed is:

1. A liquid crystal display (LCD) cell heat treatment apparatus for heat-treating a plurality of LCD cells each having liquid crystals sealed between two glass sheets, comprising:
    a liquid bath configured to contain a liquid as a medium to transfer heat to the liquid crystals in the LCD cells, the liquid crystals in the LCD cells being in the liquid bath;
    at least one heater installed in the liquid bath, the heater configured to heat the liquid in the liquid bath and transfer heat to the liquid crystals in the LCD cells; and
    at least one sound wave transmitter in the liquid bath, the sound wave transmitter configured to transmit sound waves to the liquid crystals in the LCD cells.

2. The LCD cell heat treatment apparatus according to claim 1, further comprising:
    a liquid supply tube connected to a lower portion of a side wall of the liquid bath, the liquid supply tube configured to supply the liquid to an interior of the liquid bath.

3. The LCD cell heat treatment apparatus according to claim 2, further comprising:
    a base beneath the liquid bath, the base configured to support the liquid bath;
    a power supplier in the base, the power supply configured to supply power to the heater; and
    a sound wave generator in the base, the sound wave generator configured to generate and supply the sound waves to the sound wave transmitter.

4. The LCD cell heat treatment apparatus according to claim 3, further comprising:
    a cover at a top of the liquid bath, the cover configured to seal the liquid bath.

5. The LCD cell heat treatment apparatus according to claim 1, further comprising:
    a loading device configured to load and unload the LCD cells into and from the liquid bath, the loading device including,
        a support plate configured to support the LCD cells; and
        a lever configured to vertically move the support plate.

6. The LCD cell heat treatment apparatus according to claim 5, wherein the loading device is configured to adjust a vertical level of the support plate by rotating the lever.

7. The LCD cell heat treatment apparatus according to claim 1, wherein the at least one heater comprises,
    heaters at opposite walls of the liquid bath within the liquid bath, the heaters configured to heat the liquid and maintain the liquid at a temperature so that heat is transferred to the liquid crystals in the LCD cells.

8. The LCD cell heat treatment apparatus according to claim 1, wherein the at least one sound wave transmitter comprises,
    sound wave transmitters at front, rear and bottom walls of the liquid bath within the liquid bath, the sound wave transmitters configured to transmit sound waves to the liquid crystals in the LCD cells.

9. An LCD cell heat treatment apparatus for heat-treating a plurality of LCD cells each having liquid crystals sealed between two glass sheets, comprising:
    a liquid bath configured to contain a liquid as a medium to transfer heat to the liquid crystals in the LCD cells;
    a loading device configured to load or unload the LCD cells into/from the liquid bath;
    at least one heater installed in the liquid bath, the heater configured to heat the liquid in the liquid bath such that heat is transferred to the liquid crystals in the LCD cells loaded in the liquid bath;
    sound wave transmitters respectively disposed adjacent to the LCD cells, the sound wave transmitters configured to transmit sound waves to the liquid crystals in the LCD cells; and
    at least one spacing adjuster configured to adjust a spacing between a corresponding one of the LCD cells and a corresponding one of the sound wave transmitters, the at least one spacing adjuster disposed adjacent to the corresponding LCD cell.

10. The LCD cell heat treatment apparatus according to claim 9, further comprising:
    a liquid supply tube connected to a lower portion of a side wall of the liquid bath, the liquid supply tube configured to supply the liquid to an interior of the liquid bath.

11. The LCD cell heat treatment apparatus according to claim 10, further comprising:
    a cover at a top of the liquid bath, the cover configured to seal the liquid bath.

12. The LCD cell heat treatment apparatus according to claim 11, further comprising:
    LCD cell holders at a bottom wall of the liquid bath within the liquid bath, the LCD cell holders configured to hold the LCD cells; and sound wave transmitter holders at the bottom wall of the liquid bath within the liquid bath, the sound wave transmitter holders configured to hold the sound wave transmitters.

13. The LCD cell heat treatment apparatus according to claim 12, further comprising:
a bottom plate on the bottom wall of the liquid bath within the liquid bath, the LCD cell holders and the sound wave transmitter holders attached thereto.

14. The LCD cell heat treatment apparatus according to claim 9, wherein the at least one heater comprises,
heaters at front, rear, left and right walls of the liquid bath within the liquid bath, the heaters configured to heat the liquid contained in the liquid bath and maintain the liquid at a temperature such that heat is transferred to the liquid crystals in the LCD cells.

15. The LCD cell heat treatment apparatus according to claim 9, wherein the sound wave transmitters are disposed at front, rear and bottom walls of the liquid bath within the liquid bath.

16. An LCD cell heat treatment method for heat-treating a plurality of LCD cells each having liquid crystals sealed between two glass sheets, comprising:
supplying a liquid to an interior of a liquid bath via a liquid supply tube;
heating the liquid by a heater and maintaining the liquid at a temperature;
loading the LCD cells into the liquid bath by a loading device such that the LCD cells are dipped in the heated liquid maintained at the temperature;
adjusting a spacing between each of the LCD cells and a sound wave transmitter by adjusting a vertical level of a support plate in the loading device, the support plate configured to support the LCD cells;
transmitting sound waves to the liquid crystals in the LCD cells by the sound wave transmitter; and
unloading the LCD cells from the liquid bath by the loading device after completion of the heat treatment.

* * * * *